US005475509A

United States Patent [19]
Okamoto

[11] Patent Number: 5,475,509
[45] Date of Patent: Dec. 12, 1995

[54] METHOD AND APPARATUS FOR SETTING IMAGE PROCESSING CONDITIONS

[75] Inventor: Takahiro Okamoto, Kanagawa, Japan

[73] Assignee: Fuji Photo Film Co., Ltd., Kanagawa, Japan

[21] Appl. No.: 189,746

[22] Filed: Feb. 1, 1994

[30] Foreign Application Priority Data

Feb. 2, 1993 [JP] Japan .................................. 5-015546
Dec. 21, 1993 [JP] Japan .................................. 5-322580

[51] Int. Cl.$^6$ .................................................. G03F 3/08
[52] U.S. Cl. .................... 358/518; 358/521; 358/530; 358/534
[58] Field of Search .................................. 358/455, 456, 358/518, 519, 520, 521, 522, 523, 537, 538, 530, 534

[56] References Cited

U.S. PATENT DOCUMENTS 5,155,588  10/1992  Levien .................................. 358/80

FOREIGN PATENT DOCUMENTS

4-111575  4/1992  Japan .

Primary Examiner—Sandra L. O'Shea
Assistant Examiner—John Ning
Attorney, Agent, or Firm—Sughrue, Mion, Zinn, Macpeak & Seas

[57] ABSTRACT

Finishing requirements are set (S31) and points of image data at each of which the finishing requirements should be met are specified (S32). The magnitude of correction of each of set-up parameters related to gradation is set based on halftone % data at each specified point and target halftone % data corresponding to the finishing requirements (S35). The halftone % data at each specified point is re-calculated based on the corrected set-up parameters (S36). The result of correction is evaluated and each of the set-up parameters is repeatedly corrected so as to reach the optimum value (S37). As a result, the most suitable set-up parameters can be obtained. Thus, the optimum image in which the finishing requirements are met can be obtained by image processing under the optimum set-up parameters.

3 Claims, 10 Drawing Sheets

+ CLICK POINTS

METHOD AND APPARATUS FOR SETTING IMAGE PROCESSING CONDITIONS

BACKGROUND OF THE INVENTION

1. Field of the Invention

This invention relates to a method and an apparatus for setting processing conditions of an image so that the optimum image that satisfies desired finishing requirements is obtained.

2. Description of the Related Art

An image processing system such as an image reading, recording and reproducing system has been widely used in the printing and platemaking industries, for example, for processing image information recorded on an original or subject to be read to produce original film plates, with an intention of simplifying the entire process and improving the quality of printed images.

In such image processing system, image processing conditions are set to effect desired processing on image data obtained by scanning an original. Specifically, in an image processing apparatus included in the system, in order to produce an original film plate suitable for its use, scanning conditions such as magnification, trimming ranges, number of output lines, halftone angles, are set according to pre-scanned image data obtained by roughly scanning the original. Further, finishing requirements with respect to such as adjustment of gray, adjustment of a human skin color and adjustment of brightness, are set. The original is scanned thereafter in detail to obtain full-scanned image data (see Japanese Laid-Open Patent Publication No. 4-111575).

In the above image processing apparatus, when the optimum value of a desired color is specified, for example, as one of the finishing requirements, other image processing conditions under which the image data takes the optimum value are decided and the image data is corrected based on the decided image processing conditions. However, the relationship between the optimum finishing requirements and the other image processing conditions is not necessarily uniform. Thus, a desired finished image is not necessarily assured from the corrected image data.

SUMMARY OF THE INVENTION

The present invention has been made to solve the above problem. Therefore, an object of the present invention is to provide a method and an apparatus for setting image processing conditions under which an image is adjusted in accordance with specified optimum finishing requirements.

According to one aspect of the present invention, for achieving the above object, there is provided a method of setting image processing conditions, comprising a first step of specifying at least one particular point to be corrected in image data and specifying finishing requirements to be met at the respective specified points, a second step of processing the image data at the specified points under predetermined image processing conditions to obtain processed image data, a third step of comparing the processed image data with target processed data that meet the finishing requirements to revise the image processing conditions based on the result of comparison, and a fourth step of repeating the second and third steps based on the corrected image processing conditions, if it is needed.

According to another aspect of the present invention, there is provided an apparatus for setting image processing conditions, comprising image displaying means for displaying an image comprised of image data, specifying means for specifying at least one particular point to be corrected in the image displayed on said image displaying means and specifying finishing requirements to be met at the respective specified points, storing means for storing target processed data respectively satisfying the finishing requirements, comparing means for comparing processed image data with the target processed data, the processed image data being obtained by processing the image data at the specified point under predetermined image processing conditions, and correcting means for correcting the image processing conditions based on the result of comparison made by said comparing means.

In the method and the apparatus according to the present invention, finishing requirements to be met at each of specified points of image data are set. The image data at each of the specified points is first processed under predetermined image processing conditions. It is then determined whether the resultant processed image data are near respective target processed data that satisfy the finishing requirements. If the answer is negative, then the image processing conditions are corrected and the image processing is repeated to obtain processed image data again. Finally, image processing conditions that give a desired image can be set.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENT

Figure 1:
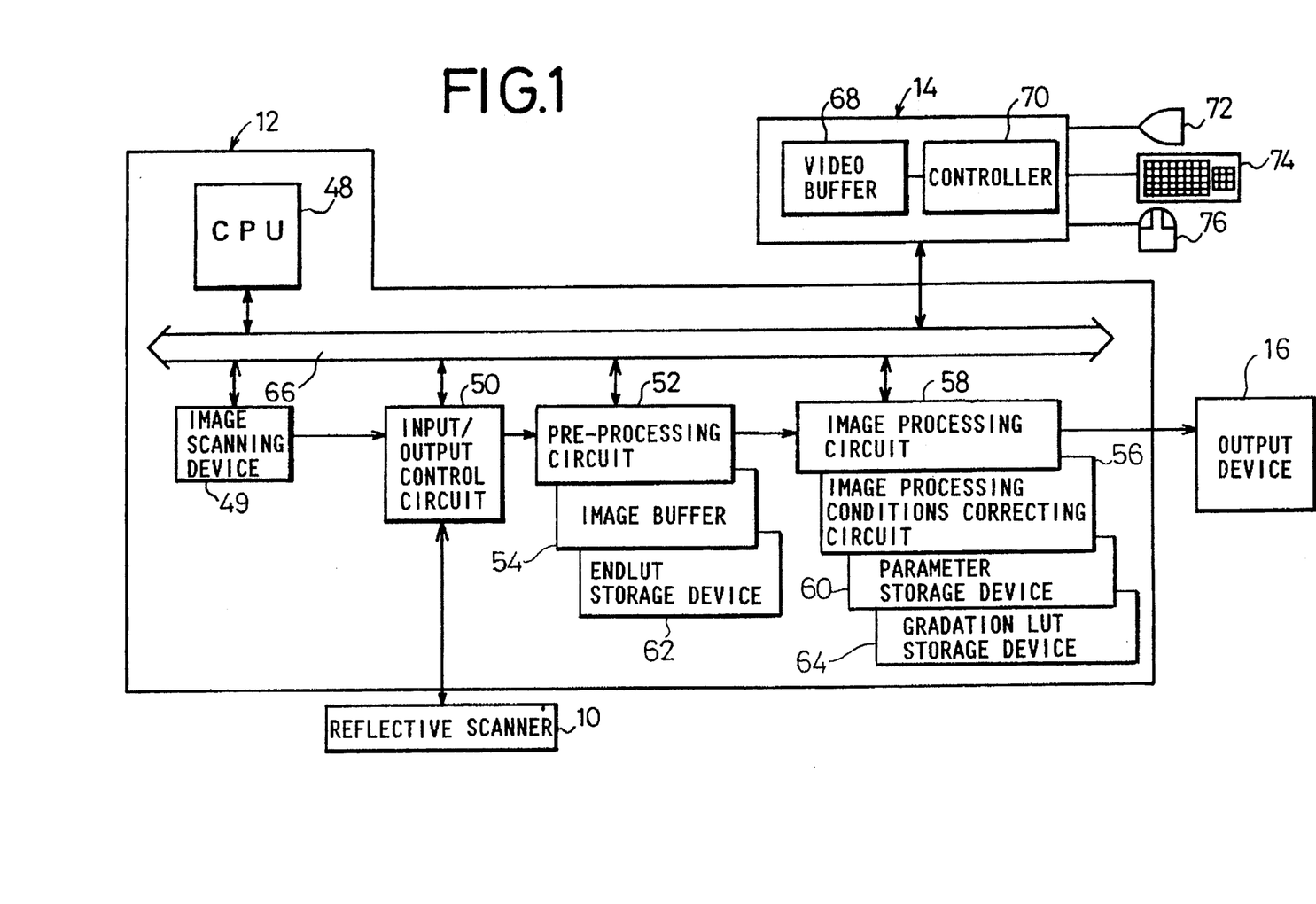
FIG. 1 is a block diagram showing the structure of an image reading, recording and reproducing system to which a method and an apparatus for setting image processing conditions, according to the present invention, is applied.

FIG. 1 is a block diagram showing the structure of an image reading, recording and reproducing system to which the method and apparatus for setting image processing conditions according to the present invention is applied. The image reading, recording and reproducing system basically comprises a reflective scanner 10 for reading image information recorded on a reflective original, a transmissive scanner 12 for reading image information recorded on a transmissive original and at the same time, controlling the reflective scanner 10 and effecting desired image processing on image data supplied therefrom, a console 14 for operating the transmissive scanner 12 and displaying an image supplied therefrom, and an output device 16 for outputting image data subjected to the desired image processing as a film original plate.

Figure 2:
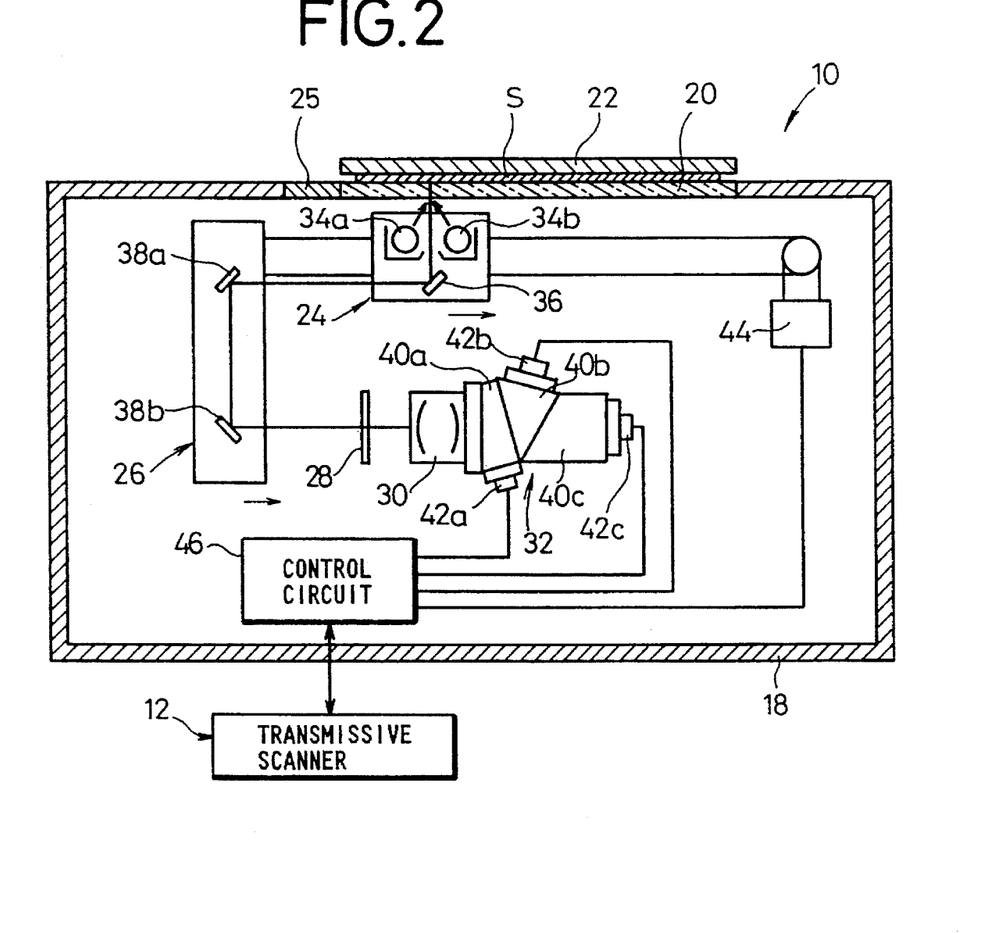
FIG. 2 is a view schematically showing the structure of a reflective scanner shown in FIG. 1.

The reflective scanner 10 is constructed as shown in FIG. 2, and provided with an original placement table 20 attached to an upper portion of a casing 18 and made up of light-transmissive glass. A reflective original S pressed by an original pressing plate 22 is placed on the original placement table 20. The original placement table 20 is provided side by side with a shading reference plate 25 for effecting a shading correction on a reading optical system. A light source 24 for irradiating light to the reflective original S, and at the same time, receiving light reflected by the reflective original S, a moving mirror 26 for changing an optical path of the reflected light, an ND filter 28 for adjusting the densities of highlights and shadows of the reflected light, a focusing lens 30, and a light-receiving device 32. The light source 24 has two lamps 34a and 34b elongated in a main scanning direction perpendicular to the sheet shown in FIG. 2, and a reflecting mirror 36. The moving mirror 26 has two reflecting mirrors 38a and 38b. The light-receiving device 32 is constituted by three prisms 40a through 40c and CCDs 42a through 42c fixed to their corresponding prisms 40a through 40c. Here, the prisms 40a through 40c separate the light reflected from the reflective original S into the three primary colors of R, G and B and introduce them into their corresponding CCDs 42a through 42c. The light source 24 and the moving mirror 26 are movable in an auxiliary or sub scanning direction, indicated by an arrow, by a conveying motor 44. The light source 24 is movable at a speed twice the speed of the moving mirror 26. The reflective scanner 10 also has a control circuit 46, which controls the entire operation and effects the control of transfer of image information obtained from the respective CCDs 42a through 42c to the transmissive scanner 12.

The transmissive scanner 12 comprises a CPU 48 (which serves as a comparing means) for carrying out the entire control, an image reading or scanning device 49 for reading image information from an unillustrated transmissive original, an input/output control circuit 50 for effecting the transfer of a signal between the reflective scanner 10 and the transmissive scanner 12, a pre-processing circuit 52 for effecting pre-processing prior to the execution of the image processing on image data, an image processing conditions correcting circuit 56 (correcting means) for carrying out the correction of image processing conditions, and an image processing circuit 58 for performing desired image processing based on the image processing conditions. An image buffer 54 for temporarily storing image data therein and an END (Equivalent Neutral Density) LUT (look-up table) storage device 62 for storing therein an ENDLUT for carrying out the conversion of an END into another are connected to the pre-processing circuit 52. A parameter storage device 60 for storing therein respective set-up parameters corresponding to the image processing conditions and a gradation LUT storage device 64 (storing means) for storing therein a reference gradation curve used as a look-up table, are connected to the image processing conditions correcting circuit 56. The parameter storage device 60 and the gradation LUT storage device 64 are connected to each other via a bus 66.

The console 14 is also connected to the bus 66. The console 14 has a video buffer 68 and a controller 70. The controller 70 controls the supply of an output to a CRT display unit 72 connected to the console 14 and processes data inputted via a keyboard 74 and a mouse 76.

The output device 16 is connected to the image processing circuit 58 and has a function of recording an image on a film based on image data supplied from the image processing circuit 58.

The image reading, recording and reproducing system employed in the present embodiment is basically constructed as described above. The operation of the image scanning recording and reproducing system and its effects will next be described below.

Figure 3:
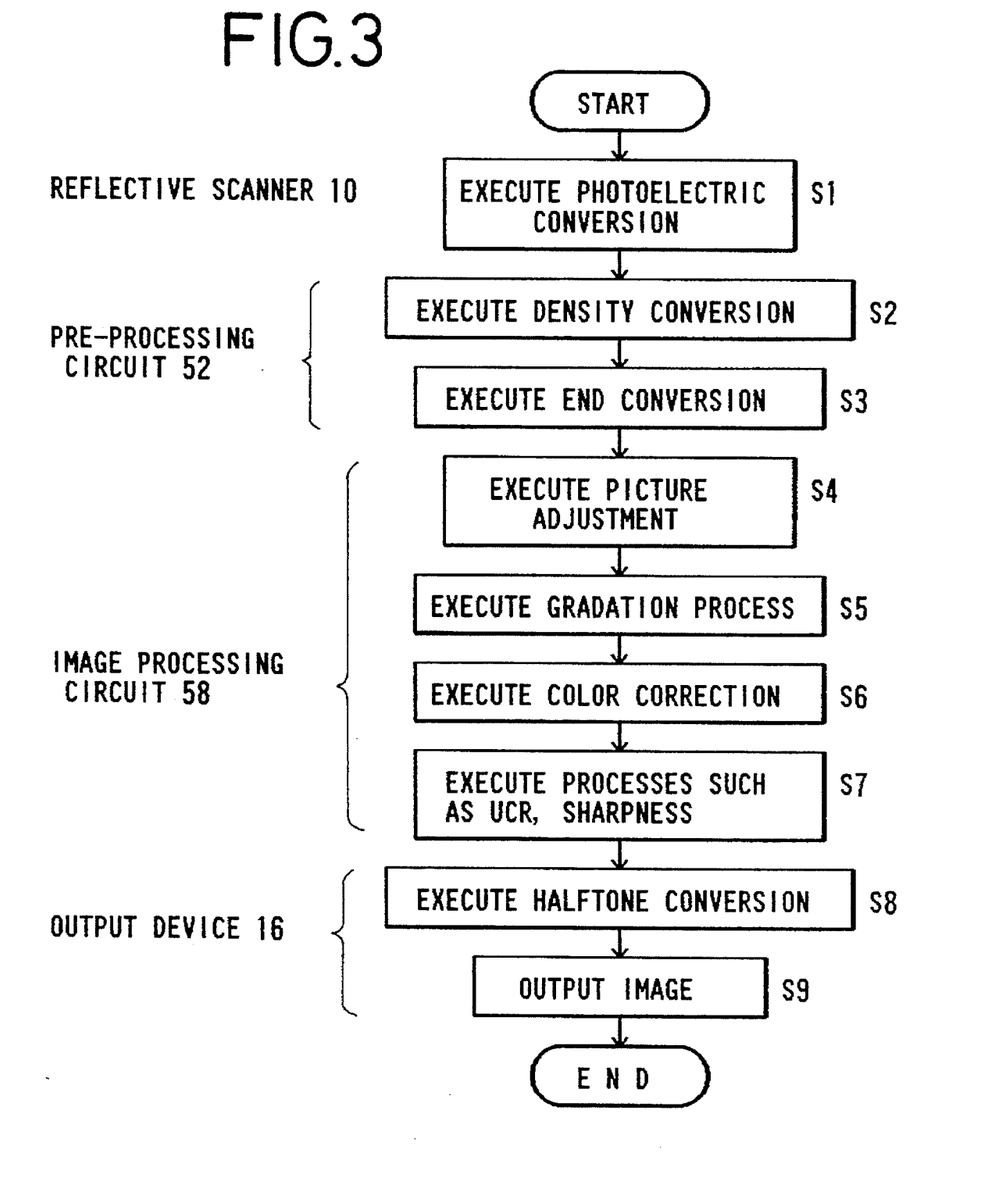
FIG. 3 is a flowchart for describing an entire operation of image processing executed by the image reading, recording and reproducing system shown in FIG. 1.

The entire operation of the image reading, recording and reproducing system will first be described with reference to a flowchart shown in FIG. 3.

When the reflective scanner 10 is used, the reflective original S is set on the original placement table 20, where the image reading surface is rendered flat by the original pressing plate 22. The reflective scanner 10 reads an image using the transmissive scanner 12 in accordance with instructions given via the keyboard 74 of the console 14. Accordingly, the conveying motor 44 is driven to cause the light source 24 and the moving mirror 26 to start moving. Here, the light source 24 first irradiates the shading reference plate 25 with light rays emitted from each of the lamps 34a and 34b and introduces the light reflected from the shading reference plate 25 into each of the CCDs 42a through 42c via the reflecting mirrors 36, 38a and 38b, the ND filter 28, the focusing lens 30 and the prisms 40a through 40c.

The CCDs 42a through 42c photoelectrically convert the reflected light into R, G and B signals and supply them to the control circuit 46 where a shading correction is made. That is, the control circuit 46 compensates for shadings caused by characteristics of the focusing lens 30 and the CCDs 42a through 42c based on the R, G and B signals obtained by scanning the shading reference plate 25.

The light source 24, then, irradiates light from each of the lamps 34a and 34b to the reflective original S placed on the original placement table 20 and reads image information as the reflected light. The CCDs 42a through 42c photoelectrically convert the image information into the R, G and B signals and supply the same to the control circuit 46 (Step S1). The control circuit 46 transmits the R, G and B signals to the transmissive scanner 12.

In the transmissive scanner 12, the R, G and B signals received via the input/output control circuit 50 are subjected to such as logarithmic conversion in the pre-processing circuit 52 under the action of the CPU 48, and R, G and B density data are produced (Step S2). The produced R, G and B density data are temporarily stored in the image buffer 54. The pre-processing circuit 52, then, effects END conversion on the R, G and B density data based on the ENDLUT prepared corresponding to the amount of dyes in the reflective original S and stored in the ENDLUT storage device 62, and dye amount data of Y, M and C are produced (Step S3).

The image processing circuit 58 effects picture adjustment for adjusting the densities of highlights and shadows of the dye amount data of Y, M and C to respective preset reference values (Step S4). Thereafter, image processes such as gradation (Step S5), color correction (Step S6), UCR (Under Color Removal), and sharpness enhancement (Step S7), are performed by the image processing circuit 58 based on the image processing conditions which have been corrected by the image processing conditions correcting circuit 56, as described later, and halftone % data is produced, which is outputted to the output device 16.

When image information recorded on a transmissive original is read by the transmissive scanner 12, R, G and B signals read by the image scanning device 49 are transmitted to the pre-processing circuit 52 via the input/output control circuit 50, where these signals are processed in a manner similar to the reflective original S.

The output device 16 converts the halftone % data outputted from the image processing circuit 58 into halftone data for on/off-controlling a laser beam (Step S8), and a desired image is recorded on a film according to the halftone data (Step S9).

The image reading, recording and reproducing system is operated as described above to produce the original film plate. A description will next be made of how the image processing conditions are set in the image reading, recording and reproducing system.

Figure 4:
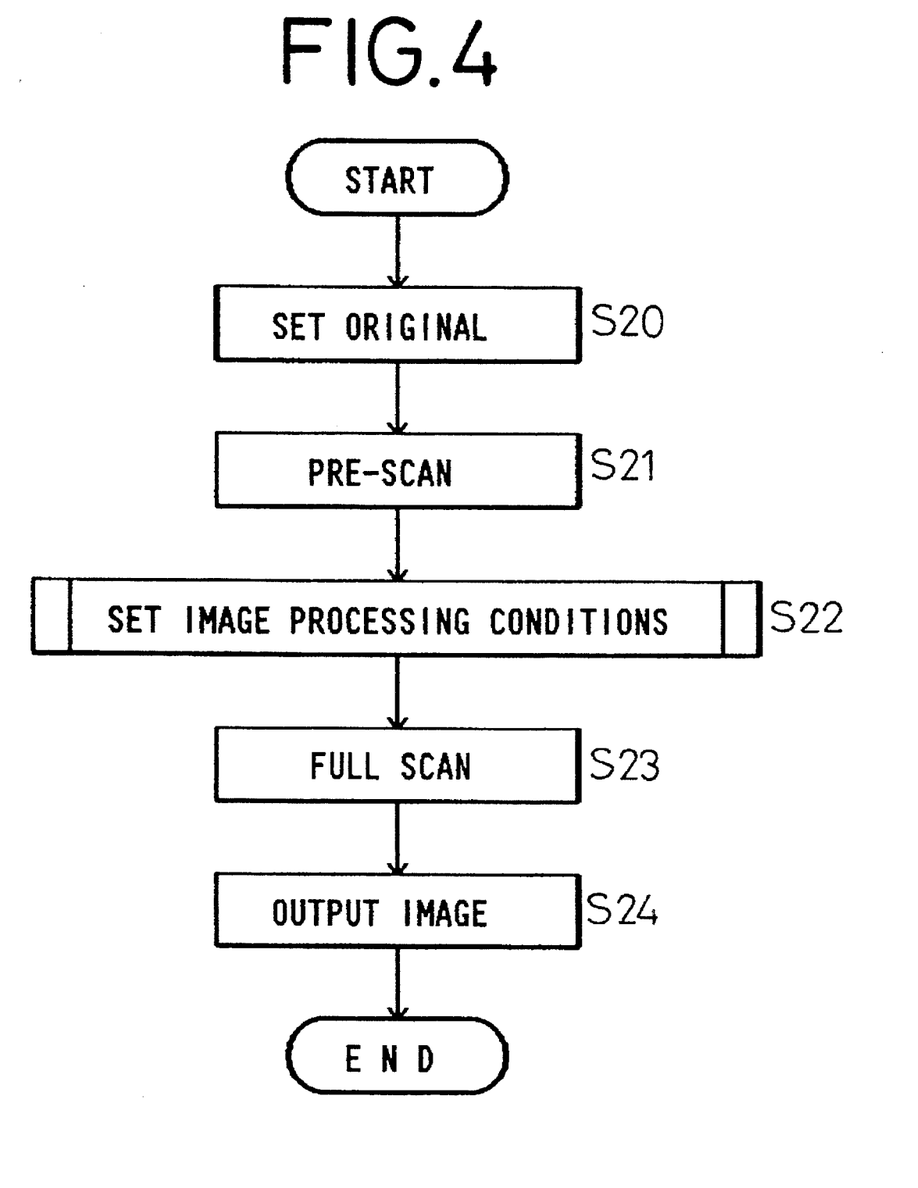
FIG. 4 is a general flowchart for describing the image processing executed by the image reading, recording and reproducing system shown in FIG. 1.

In the image reading, recording and reproducing system, the reflective original S (or the transmissive original) is set to the reflective scanner 10 (or the transmissive scanner 12) as described in a flowchart of FIG. 4 (Step S20). Thereafter, pre-scanning for roughly reading image information recorded on the reflective original S (or the transmissive original) is first performed (Step S21). The transmissive scanner 12 automatically sets a part of image processing conditions based on the pre-scanned image data obtained by the pre-scanning. The image processing conditions are used to control respective processes such as picture adjustment, gradation, color correction, UCR, or sharpness enhancement.

Here, the transmissive scanner 12 can automatically set the part of the image processing conditions according to fuzzy inference rules. That is, the pre-scanned image data is stored in the image buffer 54 and displayed on the CRT display unit 72 connected to the console 14 and characteristic values of the pre-scanned image data are calculated. A cumulative histogram of density (cumulative percentage vs density) in each region of the screen divided into a predetermined number of sectors (e.g., ¼ or ⅛), an average density, a maximum peak density, or cumulative density histograms of Y, M and C in each of the regions, are examples of characteristic values.

Originals classifying information as the part of the image processing conditions is determined in accordance with the fuzzy inference rules describing the relationship between these characteristic values and the original characteristics to be sought, for example:

(a) IF the average density is very low, THEN the original is an excessively over exposed one.

(b) IF the average density is low, THEN the original is an over exposed one.

(c) IF the average density is slightly low, THEN the original is a slightly over exposed one.

(d) IF the average density is medium, THEN the original is a normal one.

(e) IF the average density is slightly high, THEN the original is a slightly under exposed one.

(f) IF the average density is high, THEN the original is an under exposed one.

(g) IF the average density is very high, THEN the original is an excessively under exposed one.

As described above, an entire range of the average density is classified into seven categories (a) through (g), under any one of which every pre-scanned image data will fall. In addition to the above, information such as highkey or lowkey, existence or not of a highlight point, existence or not of a particular pattern of the picture, a skin color or a color fog, are other examples of the originals classifying information.

Fuzzy inference rules similar to the above can be applied to derive other kinds of originals classifying information. For instance, the following fuzzy rules, on the basis of the originals classifying information referred to above, establish set-up parameters as other part of image processing conditions:

(a') IF the original is excessively over exposed one, THEN a highlight-point density is 0.05.

(b') IF the original is over exposed one, THEN the highlight-point density is 0.10.

(c') IF the original is slightly over exposed one, THEN the highlight-point density is 0.15.

(d') IF the original is normal, THEN the highlight-point density is 0.20.

(e') IF the original is slightly under exposed one, THEN the highlight-point density is 0.30.

(f') IF the original is under exposed one, THEN the highlight-point density is 0.40.

(g') IF the original is very under exposed one, THEN the highlight-point density is 0.50.

As will be described later, the set-up parameters can also be set manually in relation to finishing requirements (Step S22).

When the image processing conditions are set in the above-described manner, the reflective scanner 10 (or the transmissive scanner 12) then full-scans the reflective original S (or the transmissive original) to read the image information recorded thereon in detail (Step S23). The image processing circuit 58 effects desired image processing on full-scanned image data under the image processing conditions set in Step S22. Thereafter, the image processing circuit 58 transmits the so-processed image data to the output device 16 so as to reproduce and output an image (Step S24).

A description will next be made of a method of setting the set-up parameters in relation to the finishing requirements at the time when the image processing conditions are set in Step S22 of FIG. 4.

Figure 5:
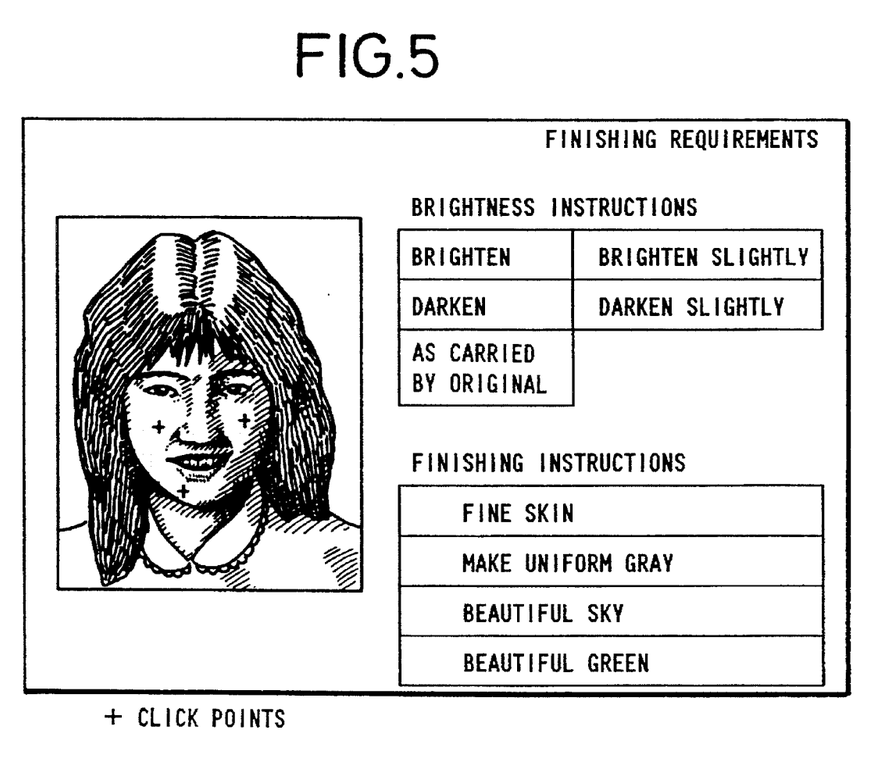
FIG. 5 is a view for explaining a picture displayed on a console screen employed in the image reading, recording and reproducing system shown in FIG. 1.

Upon setting the image processing conditions, a picture shown in FIG. 5 is displayed on the screen of the CRT display unit 72 connected to the console 14. That is, the image obtained by the pre-scanning in Step S21 is displayed on the screen referred to above. Further, finishing requirements selected by an operator are also displayed on the screen. The finishing requirements are classified into brightness instructions and finishing instructions, for example. Any one of the brightness instructions such as "brighten", "brighten slightly", "darken", "darken slightly" and "as carried by original" can be selected by the mouse 76. Any one of the finishing instructions such as "fine skin" "make uniform gray" "beautiful sky" and "beautiful green" can be selected.

Figure 6:
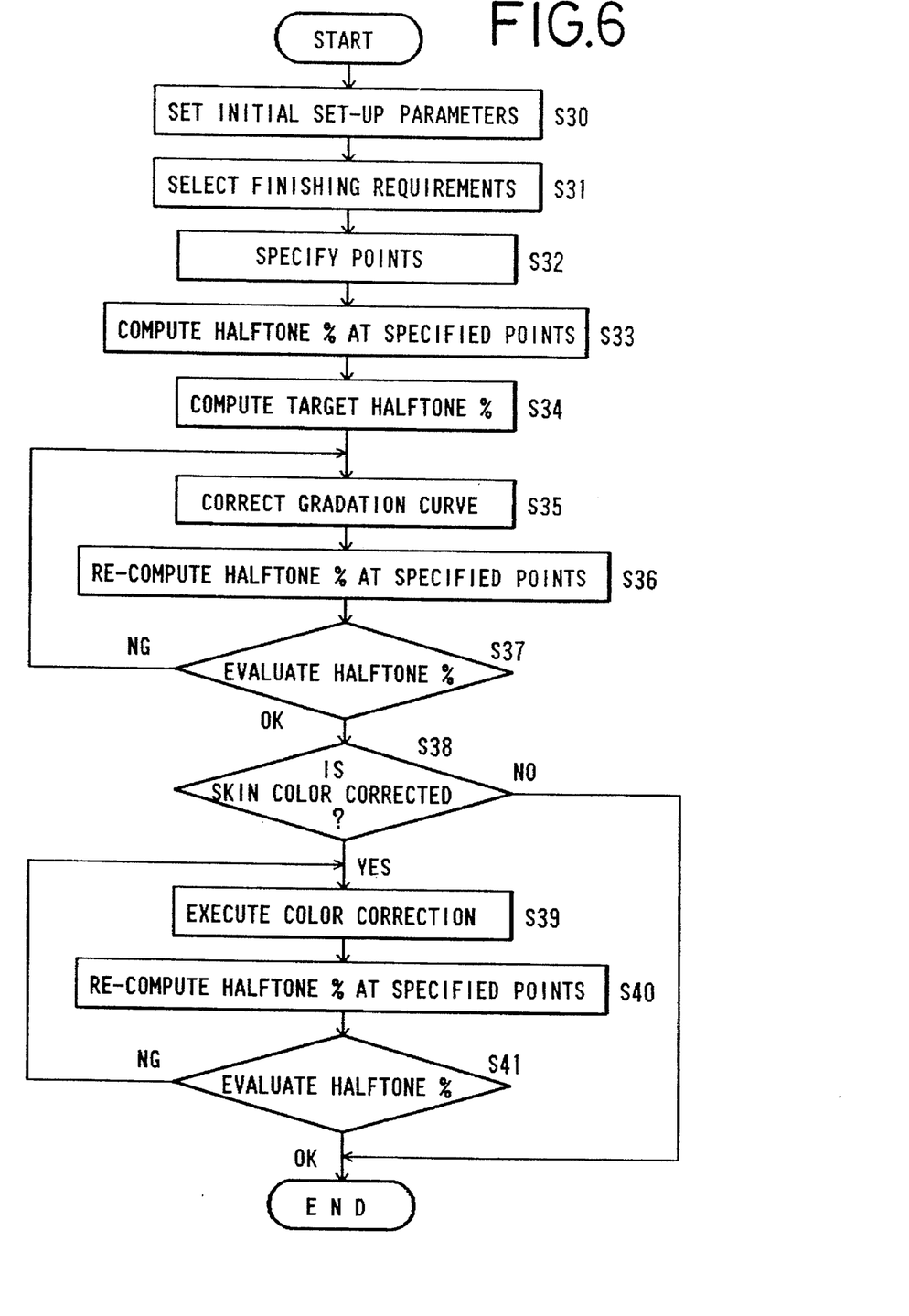
FIG. 6 is a detailed flowchart for describing the setting of image processing conditions according to the general flowchart shown in FIG. 4.

A description will now be made of the case where the term "fine skin" is selected as the finishing instruction, with reference to a flowchart of FIG. 6.

An initial set-up parameter corresponding to the correction amount from the standard gradation curve stored in the gradation LUT storage device 64 is first set by using the aforementioned fuzzy inference rules and stored in the parameter storage device 60 (Step S30). Then, the operator selects the term "fine skin" on the screen shown in FIG. 5 using the mouse 76 (Step S31), and specifies, on the pre-scanned image, one or more points to be finished as "fine skin" (Step S32).

Next, halftone % data corresponding to the dye amount data of Y, M and C at the specified points are calculated by using a gradation curve corrected based on the initial setup parameter (Step S33).

Figure 7:
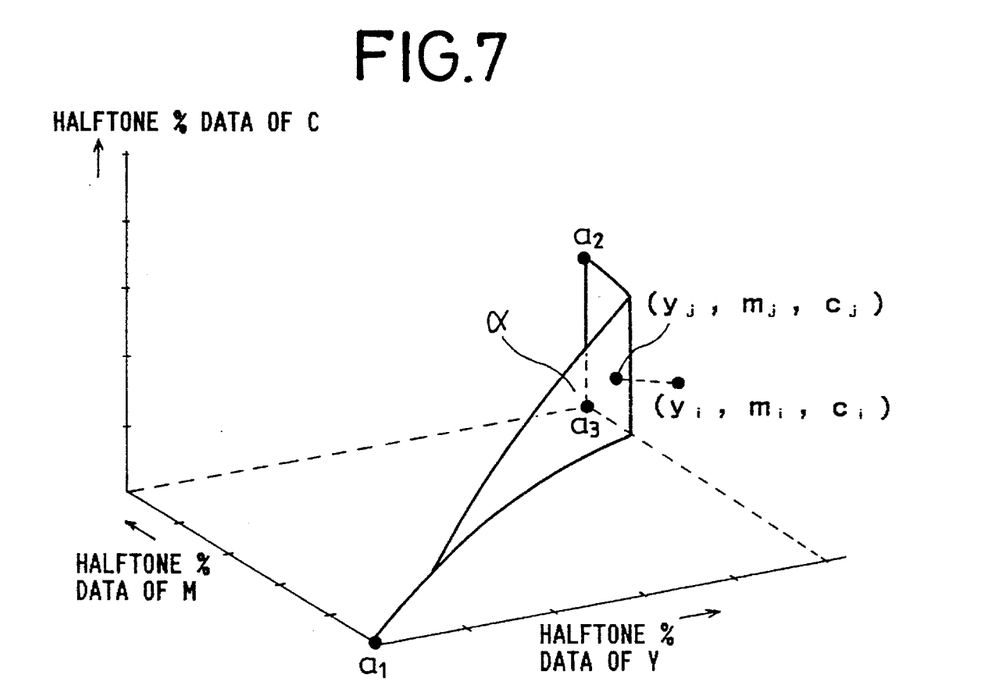
FIG. 7 is a view for explaining the relationship of ideal halftone % data to a finishing requirement corresponding to "fine skin"

On the other hand, ideal halftone % data corresponding to the term "fine skin" specified by the operator is read from the gradation LUT storage device 64 and target halftone % data closest to the halftone % data at the specified points are calculated (Step S34). The ideal halftone % data corresponding to the term "fine skin" is defined as data on a surface $\alpha$ surrounded by points $a_1$, $a_2$ and $a_3$ in FIG. 7. That is, when halftone % data at each of the specified points are represented as $y_i$, $m_i$ and $c_i$ with respect to the Y, M and C dyes, and the ideal halftone % data are represented as $y_j$, $m_j$ and $c_j$, the target halftone % data are defined as the ideal halftone % data $y_j$, $m_j$ and $c_j$ in which an index $r_i$ defined by the following equation (1) is minimized.

$$r_i^2 = (y_i - y_j)^2 + (m_i - m_j)^2 + (c_i - c_j)^2 \ldots \quad (1)$$

where $y_i$, $m_i$ and $c_i$: halftone % data at ith specified point $y_j$, $m_j$ and $c_j$: ideal halftone % data.

The halftone % data and the target halftone % data obtained by carrying out the above calculation at respective specified points are averaged for each of the Y, M and C dyes.

Then, comparison between the averaged halftone % data and the averaged target halftone % data is made. When the averaged halftone % data about the hue of Y at one of the specified points is smaller than the averaged target halftone %, a set-up parameter about middle separation (MS) on a gradation curve relative to the hue of Y is increased a predetermined amount.

On the other hand, when the averaged halftone % data is smaller than the averaged target halftone % data, the set-up parameter is decreased. The same operations as described above are carried out with respect to each of the hues of M and C. Thereafter, set-up parameters corrected for the Y, M and C hues are stored in the parameter storage device 60 (Step S35).

Next, the halftone % data at respective specified points are re-calculated based on the gradation curve obtained using the so-corrected set-up parameters in a manner similar to Step S33 (Step S36).

Thereafter, the halftone % data obtained by correcting the set-up parameters is evaluated (Step S37). That is, let an evaluation function $f_y$ represent how far the halftone % data for Y at one of the specified points is away from the target halftone % data as a whole, wherein the halftone % data for Y is determined before the set-up parameter about the middle separation (MS) is changed. Then, define another evaluation function $f_y'$ which is obtained after the set-up parameter about the middle separation (MS) is corrected. Respective evaluation functions are represented by the following equations (2) and (3):

$$f_y = \sum_{i=1}^{n} r_i \qquad (2)$$
$$= \sum_{i=1}^{n} w_i \cdot \sqrt{(y_i - y_{i0})^2}$$

$$f_y' = \sum_{i=1}^{n} r_i' \qquad (3)$$
$$= \sum_{i=1}^{n} w_i \cdot \sqrt{(y_i' - y_{i0})^2}$$

where n: number of specified points $y_i$: halftone % data about hue of Y determined before MS correction at i-th specified point $y_{i0}$: target halftone % data about hue of Y at i-th specified point $w_i$: weighting factor at i-th specified point $y_i'$: target halftone % data about hue of Y at i-th specified point determined after MS correction $r_i$: index for hue of Y determined before MS correction at i-th specified point $r_i'$: index for hue of Y determined after MS correction at i-th specified point.

When hues at the points specified by the operator are different from each other, the weighted factor $w_i$ is used to correct differences between the hues, which are automatically set so as to eliminate the differences.

If $f_y > f_y'$, then the halftone % data about Y at one of the specified points is judged as being in the near of the target halftone % data as a whole, and a corrected value of a set-up parameter about the middle separation (MS) is therefore judged as being proper. Then, the corrected value is set to the parameter storage device 60.

On the other hand, if $f_y < f_y'$, then the halftone % data about Y at the specified point is judged as being away from the target halftone % data as a whole. It is therefore judged that the correction of a set-up parameter about the middle separation (MS) has been made in excess, and the correction is reduced to ½, for example.

Judgement is made also as to whether the correction of the set-up parameters have been proper for the hues of M and C, by using evaluation functions similar to the above $f_y$ and $f_y'$.

The steps S35 through S37 are repeatedly executed to repeatedly correct the set-up parameters about the middle separation (MS). When the corrected values are evaluated as being proper with respect to the hues of Y, M and C, the set-up parameters about the middle separation (MS) are set to the parameter storage device 60 in due form.

Similarly, set-up parameters with respect to highlight separation (HS) and shadow separation (SS) on the gradation curve are set. Thus, the setting of the set-up parameters for correcting the gradation curve is completed.

When the term "fine skin" is next selected as the finishing instruction (Step S38), a fine adjustment is effected on each of the hues of Y, M and C. Since the skin color is comprised principally of the hues of Y and R, only pre-scanned image data decided as having the hue of R within a predetermined extent are first selected. Then, color correction is performed on the dye amount data of Y, M and C of the extracted pre-scanned image data (Step S39). Further, processes similar to those in Steps S36 and S37 are executed (Steps S40 and S41) to thereby correct set-up parameters with respect to the amount of dyes referred to above. Similarly, the dye amount data are corrected and set-up parameters are set with respect to pre-scanned image data having the hue of Y.

Figure 8:
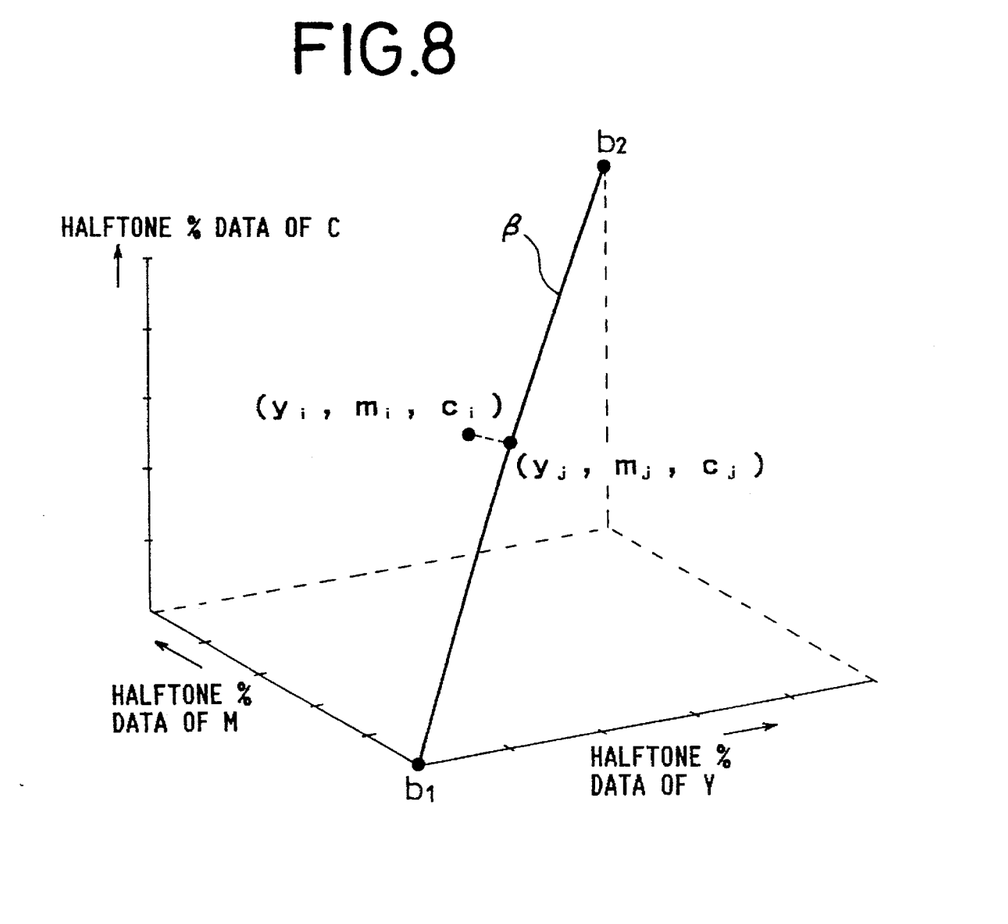
FIG. 8 is a view for describing the relationship of ideal halftone % data to a finishing requirement corresponding to "uniform gray"

When the term "make uniform gray" is selected as the finishing requirement, similar operations as described above are performed to set the set-up parameters, except for the color correction (Step S39 through S41). Here, the ideal halftone % data corresponding to the finishing requirement of "make uniform gray" is defined as data on a curved line segment β between points $b_1$ and $b_2$ in FIG. 8.

Figure 9:
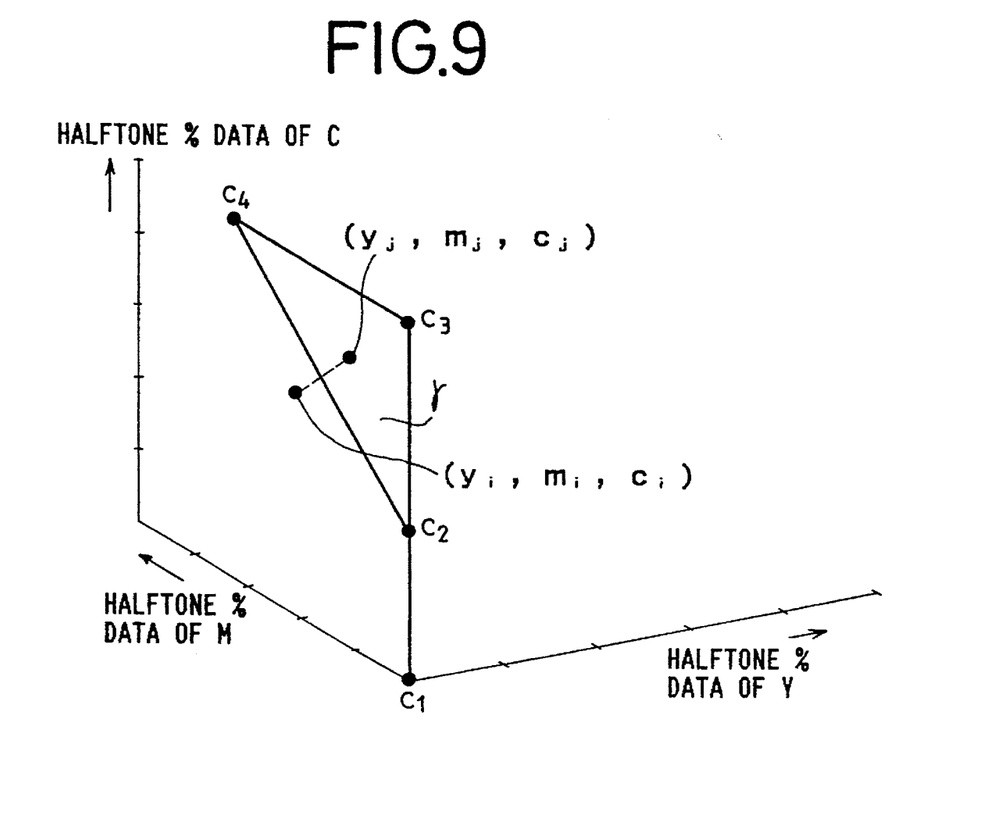
FIG. 9 is a view for describing the relationship of ideal halftone % data to a finishing requirement corresponding to "beautiful sky"

When the term "beautiful sky" is selected as the finishing requirement, set-up parameters can be set in a manner similar to the case when the term "fine skin" is selected. In this case, the ideal halftone % data corresponding to the finishing requirement of "beautiful sky" is defined by two data: data on a line segment $\gamma_1$ formed between points $c_1$ and $c_2$ in FIG. 9 and data on a surface $y_2$ surrounded by points $c_2$, $c_3$ and $c_4$ in FIG. 9.

Figure 10:
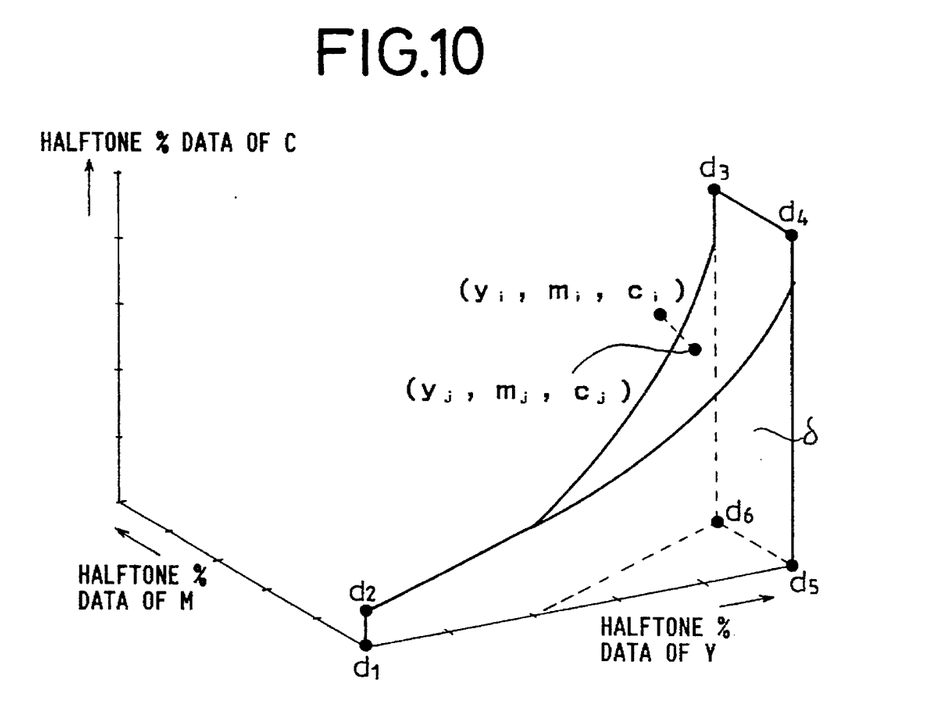
FIG. 10 is a view for describing the relationship of ideal halftone % data to a finishing requirement corresponding to "beautiful green".

When the term "beautiful green" is selected as the finishing requirement, the target halftone % data is calculated in Step S34 of FIG. 6 in the following manner. That is, the ideal halftone % data corresponding to the term "beautiful green" is defined as the data existing within a solid δ surrounded by points $d_1$, $d_2$, $d_3$, $d_4$, $d_5$ and $d_6$ in FIG. 10. Accordingly, the ideal halftone % data on the surface of the solid δ, which is closest to the halftone % data at a specified point instructed by the operator, is determined in accordance with the equation (1). The determined data is set as temporary target halftone % data. It is then determined whether the above halftone % data at the specified point exists inside or outside the solid δ. If the halftone % data exists inside the solid δ, then the halftone % data at the specified point is set to true target halftone % data and the processes subsequent to Step S35 are omitted. On the other hand, if the halftone % data exists outside the solid δ, then the above temporary target halftone % data is set to true target halftone % data and the processes subsequent to Step S35 are effected to correct the gradation curve.

When all the terms: "fine skin", "make uniform gray", "beautiful sky" and "beautiful green" are instructed by the operator as the finishing requirements, the evaluation function represented by the equation (2) is replaced with a new evaluation function f as follows:

$$f = \sum_{j=1}^{n} k_j \sum_{i=1}^{n} w_{ij} \cdot F(y_{ij} - y_{ij0}) \quad (4)$$
$$= \sum_{j=1}^{4} k_j \sum_{i=1}^{n} w_{ij} \cdot \sqrt{(y_{ij} - y_{ij0})^2}$$

where j :1="fine skin", 2= "make uniform gray"

3="beautiful sky" and 4="beautiful green"

n: number of specified points $k_j$, $w_{ij}$: weighting factors $y_{ij}$: halftone % data about hue of Y at ith specified point, which is to be determined before MS correction $Y_{ij0}$: target halftone % data about hue of Y at ith specified point.

The evaluation function represented by the equation (3) is also replaced with a new evaluation function f' in the same manner as described above. All the finishing requirements can be set and satisfied by judging the corrected set-up parameters based on the new evaluation functions f and f'.

After the image processing conditions have been set based on the pre-scanned image data in the above-described manner, the reflective original S is full-scanned (Step S23). The gradation and the color correction are effected on the resultant full-scanned image data based on the image processing conditions, thereby making it possible to obtain high-accuracy image data in which the finishing requirements are met.

Having now fully described the invention, it will be apparent to those skilled in the art that many changes and modifications can be made without departing from the spirit or scope of the invention as set forth herein.

What is claimed is:

1. A method of setting image processing conditions, comprising:

a first step of specifying at least one point to be corrected in image data and specifying finishing requirements to be met at said specified point;

a second step of processing the image data at said specified point under predetermined image processing conditions to obtain processed image data; and a third step of comparing said processed image data with target processed data and correcting said image processing conditions based on a result of said comparison, said target processed data satisfying said finishing requirements, wherein said comparison of said processed image data with said target processed data in said third step is effected by using the following evaluation function f:

$$f = \sum_{j=1}^{m} k_j \sum_{i=1}^{n} w_{ij} \cdot f(y_{ij} - y_{ij0})$$

where j: integer designating one of said finishing requirements, m: number of said finishing requirements, i: integer designating said at least one specified point, n: number of said specified points, $k_j$, $w_{ij}$: weighting factors, $y_{ij}$: non-corrected processed image data at i-th said specified point, $y_{ij0}$: target processed data at i-th said specified point, and F: function having ($y_{ij}-y_{ij0}$) as a variable.

2. An apparatus for setting image processing conditions, comprising:

image displaying means for displaying an image comprised of image data;

specifying means for specifying at least one point to be corrected in the image displayed on said image displaying means and specifying finishing requirements to be met at said specified point;

storing means for storing target processed data respectively satisfying said finishing requirements;

comparing means for comparing processed image data with said target processed data, said processed image data being obtained by processing said image data at said specified point under predetermined image processing conditions; and correcting means for correcting said image processing conditions based on a result of said comparison made by said comparing means;

wherein said comparison of said processed image data with said target processed data in said third step is effected by using the following evaluation function f:

$$f = \sum_{j=1}^{m} k_j \sum_{i=1}^{n} w_{ij} \cdot f(y_{ij} - y_{ij0})$$

where j: integer designating one of said finishing requirements, m: number of said finishing requirements, i: integer designating said at least one specified point, n: number of said specified points, $k_j$, $w_{ij}$: weighting factors, $y_{ij}$: non-corrected processed image data at i-th said specified point, $y_{ijo}$: target processed data at i-th said specified point, and F: function having $(y_{ij} - y_{ijo})$ as a variable.

3. A method according to claim 1, wherein said third step yields corrected image data processed under said corrected image processing conditions; and further comprising a fourth step of repeating said second and third steps if said corrected image data is determined to require further correction.

* * * * *